Patented Oct. 21, 1941

2,259,598

UNITED STATES PATENT OFFICE 2,259,598

SEPARATING PHENOLS FROM PRODUCTS CONTAINING THEM

Herbert Wittek, Mannheim-Freudenheim, Germany, assignor to Otto Saladin, Säurefabrik Schweizerhall near Schweizerhalle near Basel-Land, Switzerland No Drawing. Application May 31, 1938, Serial No. 210,938. In Germany June 5, 1937

4 Claims. (Cl. 23—201)

This invention relates to a process for separating phenols or phenols and bases from phenol containing products, especially tar oils and the like, containing hydrocarbons, for refining hydrocarbons and phenols, and eventually for separating magnesium oxide from the burnt dolomite or the like.

It is well known to separate phenols from tar oils and the like by means of aqueous diluted or concentrated alkaline solutions. This process, however, is uneconomic especially in connection with oils rich in phenols, primary (low temperature) tars of any kind and cracking products such as of hydrogenation of coal.

Now I have found that the separation of the phenols and, if desired, the bases from phenol containing materials can be effected in a simple, extraordinarily economic manner and the drawbacks of the hitherto employed processes can be avoided by treating the materials in presence of water or another medium dissolving the phenolates formed with a mixture of alkaline earth metal oxides, especially quicklime, and magnesium oxide of natural or artificial origin. Burnt dolomite or also sintered or fused dolomite has been proved to be an especially adapted dephenolizing expedient.

I have further found that gas water or tar water or similar aqueous by-products obtained in the distillation of bituminous substances such as coal or wood are excellently suitable as solvents for calcium phenolates. These aqueous products contain certain substances of acid character, especially hydrogen sulfide, hydrogen cyanide and the like which have like the phenols selective properties against a mixture of alkaline earth oxides and magnesium oxide inasmuch as they combine with the alkaline earth base, especially CaO, but do not react with the MgO. However it is recommended in all cases to remove the carbon dioxide from the gas water and the like before use.

For instance the raw tar oils are subjected in presence of a quantity of water, sufficient to dissolve the phenolates formed, to the action of finely ground burnt dolomite at room or somewhat elevated temperature, preferably at 40 to 50° C. Vigorous stirring is recommended for obtaining an intimate mixture of the different substances and phases. In some cases the quantity of the lime may be less than required for converting the quantity of phenol present to calcium phenolate according to the stoichiometric proportions, the saving of quicklime depending upon the nature of the tar oils employed. Hereby the phenolate of the employed alkaline earth is formed, which in turn keeps part of the remaining phenol dissolved, the magnesium oxide not being attached but precipitating after the reaction in form of a sludge without having substantially reacted with water, together with the other undissolved constituents of the dolomite such as silicic acid and aluminum oxide. The iron passes into the phenolate solution whereby in turn the mixture of magnesium oxide and alkaline earth metal oxide is freed from iron.

The resulting solution is then separated together with its solid residue from the layer containing the hydrocarbons. This solution contains the whole of the phenols and, in some cases, part of the bases.

Hereupon the phenolate solution may be worked up in the well-known manner. For this purpose the following method is especially adapted.

The phenolate solution is first, after further addition of quicklime if required, freed from the neutral oils dissolved therein by moderate heating in vacuo to temperatures below 60° C. The distillate is as before united with the separated layer of hydrocarbons and the whole is subjected to the action of a dilute acid, especially sulfuric acid to remove the bases. Then the hydrocarbons are refined for instance by sulfuric acid. Before or after the distillation in vacuo the sludge of magnesium oxide is separated if required; it may after removal of the adhering remainders of phenolate by washing or other appropriate methods be employed for further purifying the hydrocarbons by adding it to the hydrocarbon fraction and heating the whole for a short time, with subsequent fractionation if required. The sludge has strong absorptive and adsorptive properties and is a suitable refining agent, especially for nonsaturated hydrocarbons. Moreover, in this connection it sets free, owing to its basic nature, the bases which pass over without being decomposed as is the case when stronger alkalies are employed. In this manner one succeeds in removing, if required, the bases from the hydrocarbon fractions without altering them to a considerable extent, which often happens when manipulating with sulfuric acid and caustic soda solution.

From the phenolate solution the phenols may be obtained by either distilling off part of the phenols with steam with the formation of basic phenolates and a precipitate of $Ca(OH)_2$, separating the latter from the phenolate solution and setting free the phenols from the remaining basic phenolates by mineral acids, preferably carbon dioxide, or by setting the whole of the phenols free by a mineral acid. The separation of the solution is advantageously facilitated by previously adding a solvent such as light gasoline which takes up the phenol and is easily separated therefrom, for instance, by distillation.

If permanently light-colored phenols are to be obtained, it is recommended to carry out the distillation in the presence of the sludge of magnesium oxide, preferably after having introduced sulfurous acid ($SO_2$) into the mixture. The distillation in turn is preferably carried out in a current of carbon dioxide. Hereby the magnesium oxide is converted to magnesium carbonate.

The sludge of calcium carbonate represents practically pure calcium carbonate. However one may leave behind therein slight quantities of tar whereby it is rendered possible to burn the product to quicklime without obtaining a powder as in the case of burning commercial carbonate.

The sludge of calcium carbonate as well as the sludge of magnesium oxide may be used anew after previous burning or sintering. However the magnesium oxide sludge may also be employed for all purposes for which hitherto natural magnesium oxide with its contaminations was used, especially for making highly refractory bricks and preparing refractory masses.

The process is also adapted for separating phenols from gas liquors obtained in the manufacture of gas and coke. Of course, in this case the addition of water is dispensed with.

If merely the production of magnesium oxide from burnt dolomite is contemplated, the process may also be carried out with phenols obtained in any other way, the steps of separating the hydrocarbons and bases or purifying the phenols by distillation being of course dispensed with. The sludge of the magnesium oxide obtained by making phenols act on burnt dolomite in the presence of a solvent for the alkaline earth metal phenolate formed is separated from the phenolate solution and well washed out from phenolate solution and dried. The phenols are set free and separated from the mother liquor in the manner as described, and can be used for the process of separating the magnesium oxide from a new batch of burnt dolomite.

I claim:

1. The process of recovering phenols and magnesium oxide which comprises subjecting a material selected from the group consisting of tar oil, tar water and gas water to the action of a mixture of an alkaline earth metal oxide and magnesium oxide in presence of water, separating the resulting alkaline earth metal phenolate solution from the resulting magnesium oxide, decomposing the phenolate to free phenols and alkaline earth metal hydroxide, and separating the phenols.

2. The process of recovering phenols and magnesium oxide which comprises subjecting tar oil to the action of a mixture of an alkaline earth metal oxide and magnesium oxide in presence of water, separating the resulting alkaline earth metal phenolate solution from the resulting magnesium oxide and the constituents of tar oil insoluble in water, decomposing the phenolate to free phenols and alkaline earth metal hydroxide, and separating the phenols.

3. The process of recovering phenols and magnesium oxide which comprises subjecting a material selected from the group consisting of tar oil, tar water and gas water to the action of burnt dolomite in presence of water, separating the resulting alkaline earth metal phenolate solution from the resulting magnesium oxide, decomposing the phenolate to free phenols and alkaline earth metal hydroxide, and separating the phenols.

4. The process of recovering phenols and magnesium oxide which comprises subjecting a material selected from the group consisting of tar oil, tar water and gas water to the action of a mixture of an alkaline earth metal oxide and magnesium oxide in presence of water, separating the resulting alkaline earth metal phenolate solution from the resulting magnesium oxide, adding an acid to this solution, whereby the phenolate is decomposed to free phenols and alkaline earth metal hydroxide, and separating the phenols.

HERBERT WITTEK.